(12) United States Patent
Kim

(10) Patent No.: US 12,491,876 B2
(45) Date of Patent: Dec. 9, 2025

(54) VEHICLE, METHOD FOR VEHICLE, AND SYSTEM FOR VEHICLE

(71) Applicant: HL Klemove Corp., Incheon (KR)

(72) Inventor: Mingyu Kim, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 211 days.

(21) Appl. No.: 18/128,006

(22) Filed: Mar. 29, 2023

(65) Prior Publication Data
US 2023/0347884 A1 Nov. 2, 2023

(30) Foreign Application Priority Data
Mar. 30, 2022 (KR) .................. 10-2022-0039340

(51) Int. Cl.
*B60W 30/095* (2012.01)
*B60W 40/109* (2012.01)

(52) U.S. Cl.
CPC ...... *B60W 30/0956* (2013.01); *B60W 40/109* (2013.01); *B60W 2420/403* (2013.01);
(Continued)

(58) Field of Classification Search
CPC .... B60W 30/08; B60W 30/09; B60W 30/095; B60W 30/0953; B60W 30/0956; B60W 30/18145; B60W 40/072; B60W 40/02; B60W 40/109; B60W 60/001; B60W 2420/403; B60W 2420/408; B60W 2520/125; B60W 2552/30;
(Continued)

(56) References Cited

U.S. PATENT DOCUMENTS

2018/0238696 A1* 8/2018 Takeda .................... G08G 1/16
2018/0354511 A1* 12/2018 Meyer ............... B60W 50/0097
(Continued)

FOREIGN PATENT DOCUMENTS

JP 2018-139030 A 9/2018
KR 10-2015-0110634 A 10/2015
(Continued)

OTHER PUBLICATIONS

KR OA dated Feb. 2, 2024.

*Primary Examiner* — Brandon Z Willis
(74) *Attorney, Agent, or Firm* — Harvest IP Law, LLP

(57) ABSTRACT

The present disclosure relates to a vehicle, a method for the vehicle, and a system for the vehicle and is directed to calculate an avoidance trajectory more simply and quickly in calculating the avoidance trajectory for avoiding a collision with nearby another vehicle. To this end, the system disclosed herein includes a detection device provided in a host vehicle to detect a position, a direction, and a speed of the other vehicle around the host vehicle, and a controller provided in the host vehicle and configured to predict a possibility of a collision between the host vehicle and the other vehicle based on the position, the direction, and the speed of the other vehicle detected by the detection device, and calculate an avoidance trajectory for the host vehicle to avoid the collision with the other vehicle based on the possibility of the collision. The controller calculates the avoidance trajectory after replacing an actual curved road with a virtual straight road when calculating the avoidance trajectory.

10 Claims, 12 Drawing Sheets

(52) U.S. Cl.
CPC . *B60W 2420/408* (2024.01); *B60W 2520/125* (2013.01); *B60W 2552/53* (2020.02); *B60W 2554/4041* (2020.02); *B60W 2554/4042* (2020.02); *B60W 2554/4044* (2020.02); *B60W 2720/125* (2013.01); *B60W 2720/24* (2013.01)

(58) Field of Classification Search
CPC ..... B60W 2552/53; B60W 2554/4041; B60W 2554/4042; B60W 2554/4044; B60W 2720/125; B60W 2720/24; G01S 13/865; G01S 13/867; G01S 13/86; G01S 13/93; G01S 13/931; G01S 2013/9318; H04N 23/57; H04N 23/661
See application file for complete search history.

(56) References Cited

U.S. PATENT DOCUMENTS

| | | | | |
|---|---|---|---|---|
| 2019/0126930 | A1* | 5/2019 | Kim | G01C 21/32 |
| 2022/0250644 | A1* | 8/2022 | Larsson | B60W 60/0015 |
| 2023/0286536 | A1* | 9/2023 | Belman | G01C 21/3415 |

FOREIGN PATENT DOCUMENTS

| | | | |
|---|---|---|---|
| KR | 10-2020-0139443 | A | 12/2020 |
| KR | 10-2020-0140979 | A | 12/2020 |
| WO | 2017-014012 | A1 | 1/2017 |

\* cited by examiner

VEHICLE, METHOD FOR VEHICLE, AND SYSTEM FOR VEHICLE

CROSS-REFERENCE TO RELATED APPLICATION

This application claims the benefit of Korean Patent Application No. 10-2022-0039340, filed on Mar. 30, 2022 in the Korean Intellectual Property Office, the disclosure of which is incorporated herein by reference.

BACKGROUND

1. Field

Embodiments of the present disclosure relate to a vehicle and to a driver assistance system for a vehicle.

2. Description of the Related Art

In general, most driver assistance systems (DAS) avoid a collision with another vehicle that travels on the same lane or avoid a collision with a front vulnerable road user (VRU) using an autonomous emergency braking (AEB) system.

However, the above-described case corresponds to detecting obstacles around a vehicle without considering a predicted traveling path of the vehicle. In reality, when the vehicle travels along a curved path rather than a straight path, various and irregular factors are present in predicting the possibility of a collision.

SUMMARY

Therefore, it is an aspect of the present disclosure to calculate an avoidance trajectory more simply and quickly in calculating the avoidance trajectory for avoiding a collision with nearby another vehicle.

Additional aspects of the disclosure will be set forth in part in the description which follows and, in part, will be obvious from the description, or may be learned by practice of the disclosure.

In accordance with one aspect of the present disclosure, a system for a vehicle includes a detection device provided in a host vehicle to detect a position, a direction, and a speed of another vehicle around the host vehicle, and a controller provided in the host vehicle and configured to predict a possibility of a collision between the host vehicle and the other vehicle based on the position, the direction, and the speed of the other vehicle detected by the detection device and calculate an avoidance trajectory for the host vehicle to avoid the collision with the other vehicle based on the possibility of the collision. The controller may replace an actual curved road with a virtual straight road when calculating the avoidance trajectory to calculate the avoidance trajectory.

The controller may replace the actual curved road with the virtual straight road using coordinate system conversion.

The controller may remove a curvature function of a lane line of the road and a heading function of the host vehicle with respect to the lane line through the coordinate system conversion.

The controller may calculate a maximum lateral acceleration of the host vehicle on the avoidance trajectory using a trigonometric function.

The controller may restore the virtual straight road to an original curved road through coordinate system restoration after calculating the avoidance trajectory and apply the calculated avoidance trajectory to the actual curved road.

The detection device may include a front camera provided to have a forward field of view of the vehicle.

The detection device may include a front radar provided to have a forward field of sensing of the vehicle and a plurality of corner radars installed at each corner of the vehicle.

The system may further include a camera MCU provided to control the front camera, and a radar MCU provided to control the front radar and the plurality of corner radars, wherein the controller is an ECU provided to receive information on the position, the direction, and the speed of the other vehicle from the front camera, the front radar, and the plurality of corner radars by communicating with the camera MCU and the radar MCU.

In accordance with another aspect of the present disclosure, a method for a vehicle includes detecting, by a detection device provided in the vehicle, a position, a direction, and a speed of another vehicle around a host vehicle, predicting, by a controller provided in the vehicle, a possibility of a collision between the host vehicle and the other vehicle based on the position, the direction, and the speed of the other vehicle detected by the detection device, and calculating, by the controller, an avoidance trajectory for the host vehicle to avoid the collision with the other vehicle based on the possibility of the collision. The calculating of the avoidance trajectory comprises replacing an actual curved road with a virtual straight road.

Coordinate system conversion may be used to replace the actual curved road with the virtual straight road.

The method may further include removing a curvature function of a lane line of the road and a heading function of the host vehicle with respect to the lane line through the coordinate system conversion.

The method may further include calculating a maximum lateral acceleration of the host vehicle on the avoidance trajectory using a trigonometric function.

The method may further include restoring the virtual straight road to an original curved road through coordinate system restoration after calculating the avoidance trajectory; and applying the calculated avoidance trajectory to the actual curved road.

The detection device may include a front camera provided to have a forward field of view of the vehicle.

The detection device may include a front radar provided to have a forward field of sensing of the vehicle and a plurality of corner radars installed at each corner of the vehicle.

The vehicle may include a camera MCU provided to control the front camera, a radar MCU provided to control the front radar and the plurality of corner radars, and an ECU provided to calculate the avoidance trajectory after receiving information on the position, the direction, and the speed of the other vehicle from the front camera, the front radar, and the plurality of corner radars by communicating with the camera MCU and the radar MCU.

In accordance with still another aspect of the present disclosure, a system includes a detection device provided in a host vehicle to detect a position, a direction, and a speed of another vehicle around a host vehicle, and a controller provided in the host vehicle and configured to predict a possibility of a collision between the host vehicle and the other vehicle based on the position, the direction, and the speed of the other vehicle detected by the detection device and calculate an avoidance trajectory for the host vehicle to avoid the collision with the other vehicle based on the possibility of the collision. The controller may calculate the avoidance trajectory by removing a curvature function of a lane line of a road and a heading function of the host vehicle with respect to the lane line after replacing the actual curved road with a virtual straight road through coordinate system conversion.

In accordance with yet another aspect of the present disclosure, a method for a vehicle includes detecting, by a detection device provided in the vehicle, a position, a direction, and a speed of another vehicle around a host vehicle, predicting, by a controller provided in the vehicle, a possibility of a collision between the host vehicle and the other vehicle based on the position, the direction, and the speed of the other vehicle detected by a detection device and calculating, by the controller, an avoidance trajectory for the host vehicle to avoid the collision with the other vehicle based on the possibility of the collision. The avoidance trajectory is calculated by removing a curvature function of a lane line of a road and a heading function of the host vehicle with respect to the lane line after replacing the actual curved road with a virtual straight road through coordinate system conversion when calculating the avoidance trajectory.

In accordance with yet another aspect of the present disclosure, a vehicle includes a detection device provided in a host vehicle to detect a position, a direction, and a speed of another vehicle around the host vehicle, and a controller provided in the host vehicle to predict a possibility of a collision between the host vehicle and the other vehicle based on the position, the direction, and the speed of the other vehicle detected by the detection device and calculate an avoidance trajectory for the host vehicle to avoid the collision with the other vehicle based on the possibility of the collision. The controller may calculate the avoidance trajectory by removing a curvature function of a lane line of a road and a heading function of the host vehicle with respect to the lane line after replacing the actual curved road with a virtual straight road through coordinate system conversion.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
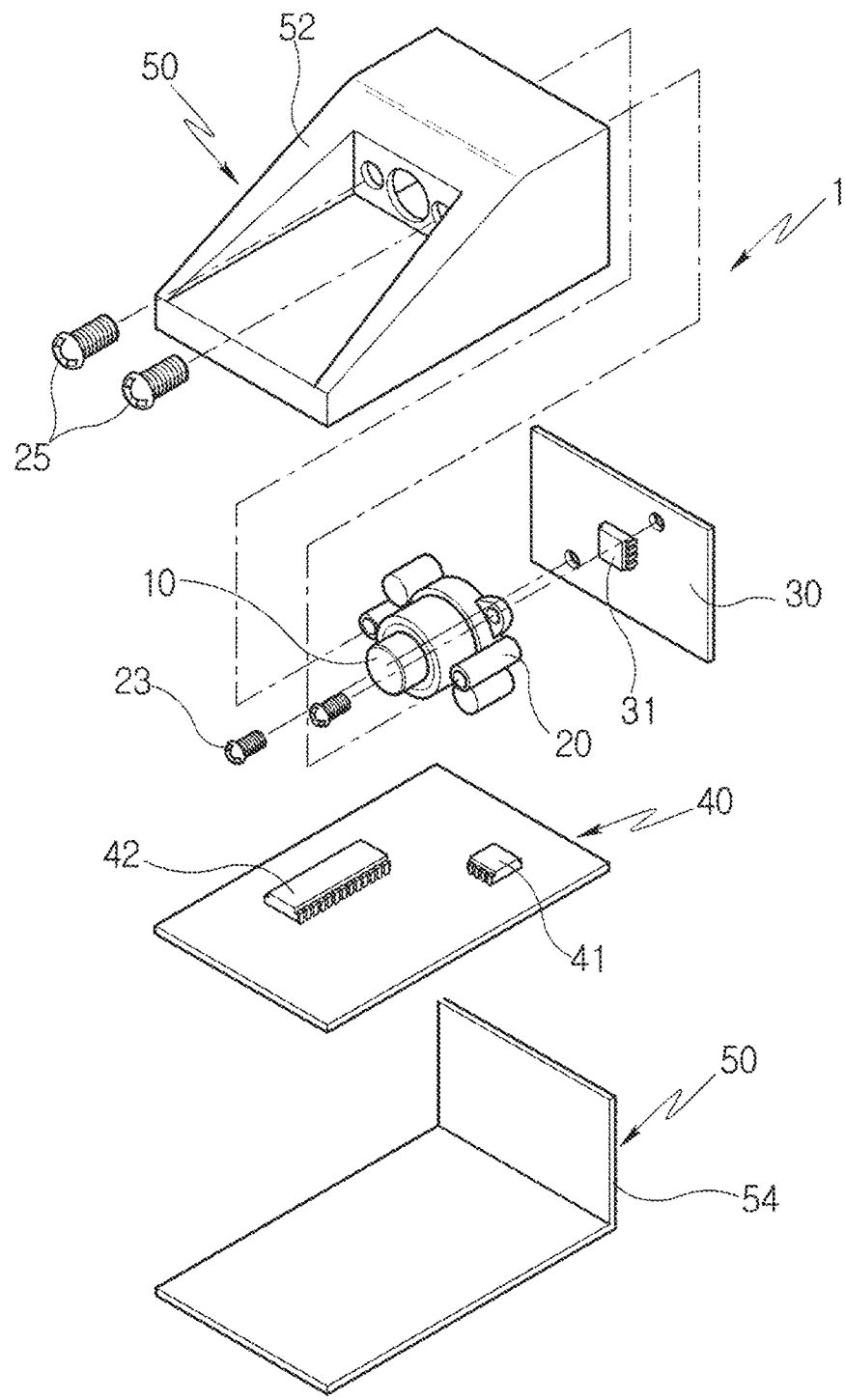
FIG. 1 is an exploded perspective view schematically showing a camera system according to one embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

FIG. 1 is an exploded perspective view schematically showing a camera system according to one embodiment of the present disclosure.

Referring to FIG. 1, a camera system 1 includes a lens 10, a lens holder 20 on which the lens 10 is installed, and an image sensor 31 coupled to the lens holder 20 to detect an image of a subject captured by the lens 10. The image sensor 31 is disposed on an image printed circuit board (PCB) 30 and includes an image array sensor formed of pixels. For example, the image sensor 31 includes a complementary metal oxide semiconductor (CMOS) photo sensor array or a charge coupled device (CCD) photo sensor array. The image sensor 31 is disposed parallel to the lens 10. In addition, the lens 10 and the lens holder 20 may be coupled in an active alignment method.

In addition, the camera system 1 includes a main PCB 40, and an image processor 41 and a camera micro control unit (MCU) 42 are disposed on the main PCB 40. The image processor 41 may receive image data from the image sensor 31, and to this end, the image processor 41 and the image sensor 31 may be connected through connectors (not shown). For example, the connectors may be formed of a flexible PCB (FPCB) to maximize the utilization of an internal space of the camera system. Electrical signals, power, control signals, and the like may be transmitted and received through the connectors. A communication method between the image processor 41 and the image sensor 31 may be, for example, an inter-integrated circuit (I2C). The camera MCU 42 and the image processor 41 may communicate with each other, and the communication method may be, for example, a universal asynchronous receiver/transmitter (UART) or a serial peripheral interface (SPI). The camera MCU 42 may receive the image data processed by the image processor 41 and transmit the image data to an electrical control unit (ECU) (not shown) in a vehicle. A communication method between the camera MCU 42 and the ECU of the vehicle may be, for example, chassis controller area network (CAN). In addition, the camera MCU 42 receives data processed by the image processor 41, and the data includes, for example, data on a preceding vehicle, data on a front lane line, data on a front cyclist, data on traffic signs, data on active high beam control (AHBC), data on wheel detection, data on traffic lights, data on road markings (e.g., arrows on the road), data on vehicle detection (VD) at any angle, data on road profiles, data on semantic free space (e.g., boundary labeling), data on general objects (side vehicles and the like), data on advanced path planning, data on advanced traffic signs, data on odometry (e.g., map matching), and the like.

In addition, the camera system 1 includes a housing 50, and the housing 50 includes an upper housing 52 and a lower housing 54. Specifically, a predetermined accommodating space is formed inside the housing 50 in which the upper housing 52 and the lower housing 54 are coupled, and the lens 10, the lens holder 20, the image PCB 30, and the main PCB 40 are accommodated in the accommodating space.

In the case of manufacturing the camera system 1, the lens 10 may be installed on the lens holder 20, and then the lens holder 20 may be coupled to the image PCB 30. For example, the lens holder 20 and the image PCB 30 may be coupled through screws 23.

Next, the upper housing 52 may be coupled in a state in which the lens holder 20 and the image PCB 30 are coupled. In this case, the upper housing 52 and the lens holder 20 may be coupled by screws 25.

Meanwhile, the number of lenses 10 used may be changed depending on a type of camera system 1, the number of pixels of the image sensor, or requirements for functions implemented by the camera system 1. For example, when one lens 10 is used, the lens may be 52 deg, for example, when 1.3 MP is required, or 100 deg, for example, when 1.7 MP is required. Alternatively, two lenses 10 may also be used. Alternatively, when three lenses 10 are used, three image sensors 31 are required, and the lenses may be 25, 52, and 150 deg or 50, 100, and 150 deg.

The type of the camera system 1 is determined according to the number or types of functions supported by the camera system 1. For example, when only some of the functions are supported (when the data processed by the image processor 41 is data on the preceding vehicle, data on the front lane line, data on the front cyclist, data on the traffic signs, data on the active high beam control, data on the wheel detection, data on the traffic lights, and data on the road markings (e.g., arrows on the road)), a single lens may be used, and when more functions are supported (when the data processed by the image processor 41 is data on the VD at any angle, data on the road profiles, data on the semantic free space (e.g., boundary labeling), data on the general objects (side vehicles and the like), data on the advanced path planning, data on the advanced traffic signs, and data on the odometry (e.g., map matching) in addition to the above-described examples), three lenses may be used.

Figure 2:
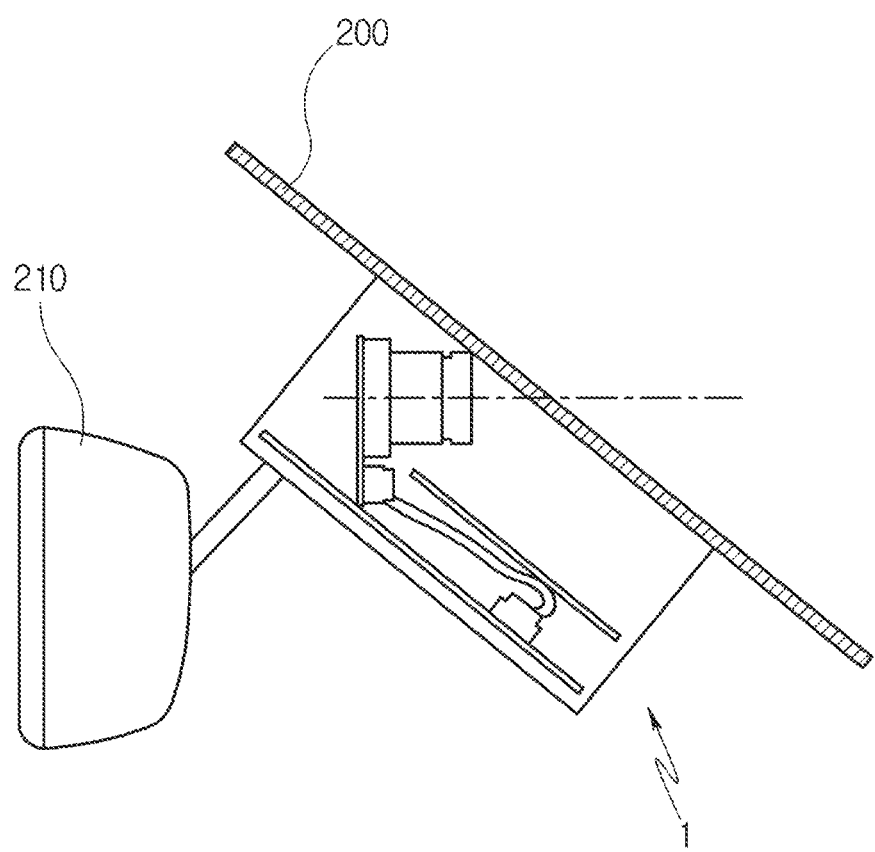
FIG. 2 is a view showing that the camera system according to the present disclosure is mounted on a vehicle.

FIG. 2 is a view showing that the camera system 1 according to the present disclosure is mounted on a vehicle.

As shown in FIG. 2, the camera system 1 may be mounted inside an internal space under a windshield 220 in the vehicle and mounted near a room mirror 210. Therefore, the camera system 1 is used to capture a forward field of view of the vehicle and used to recognize an object present within the forward field of view. In addition, in order to cope with a rainy situation or a dusty situation, the camera system 1 is mounted inside the vehicle to correspond to a region cleaned by a wiper driven at an outer side of the windshield 220. Meanwhile, a position at which the camera system 1 is mounted is not limited thereto. The camera system 1 may also be installed at other positions to capture forward, rearward, leftward, and rightward images of the vehicle.

Meanwhile, a radar device (not shown), which is a sensor device that uses electromagnetic waves to measure a distance, speed, or angle of the object, may be representatively positioned on a front grille of the vehicle to cover even a lower front portion of the vehicle. The reason why the radar device is disposed on the front grille, that is, the reason why the radar device is disposed outside the vehicle, that is, the reason why the radar device is disposed not to transmit and receive the electromagnetic waves through the windshield 220 of the vehicle is that a sensitivity is reduced when the electromagnetic waves pass through a glass due to the nature of the electromagnetic waves. According to the present disclosure, the radar device can prevent the electromagnetic waves from passing through the windshield even in a state of being positioned inside the vehicle, specifically, positioned under the windshield 220 in the internal space of the vehicle. To this end, the radar device is configured to transmit and receive the electromagnetic waves through an opening provided at an upper end of the windshield 220. In addition, a cover is disposed at a position corresponding to the opening for the radar device. Such a cover is intended to prevent loss (e.g., introduction of air or the like) due to the opening. In addition, the cover is made of a material that electromagnetic waves of a frequency used by the radar device easily pass through. As a result, the radar device is positioned inside the vehicle, but transmits and receives the electromagnetic waves through the opening provided in the windshield 220, the cover is provided to correspond to the opening to prevent the loss due to the opening, and the electromagnetic waves are transmitted and received through the cover. Such a radar device may use beam aiming, beam selection, digital beam forming, and digital beam steering. In addition, the radar device may include an array antenna or a phase alignment array antenna.

The camera system 1 and the above-described radar device (not shown) may be interworked with each other to improve the performance of detecting the front object. For example, the image processor 41 and a radar processor (not shown) may be interworked with each other to enlarge or focus a front object of interest. As described above, when the radar device and the front camera are interworked with each other, the image sensor 31 and the radar device may be disposed on the same board (e.g., the image PCB 30).

In addition, a device or system for detecting an object present in a forward field of view like the camera system 1 or the radar device (not shown) may be used for an advanced driver assistance system (ADAS) technology, such as adaptive cruise control (ACC). In addition, the device or system may also be used to recognize a potentially dangerous situation ahead and, for example, used to recognize preceding other vehicles, front people, or front animals. In addition, the device or the system for detecting the object present in the forward field of view like the camera system 1 or the radar device (not shown) may be used in a lane departure warning system, an object detection system, a traffic sign recognition system, a lane keeping assistance system, a lane change assistance system, a blind spot warning system, an automatic headlamp control system, a collision avoidance system, or the like.

Figure 3:
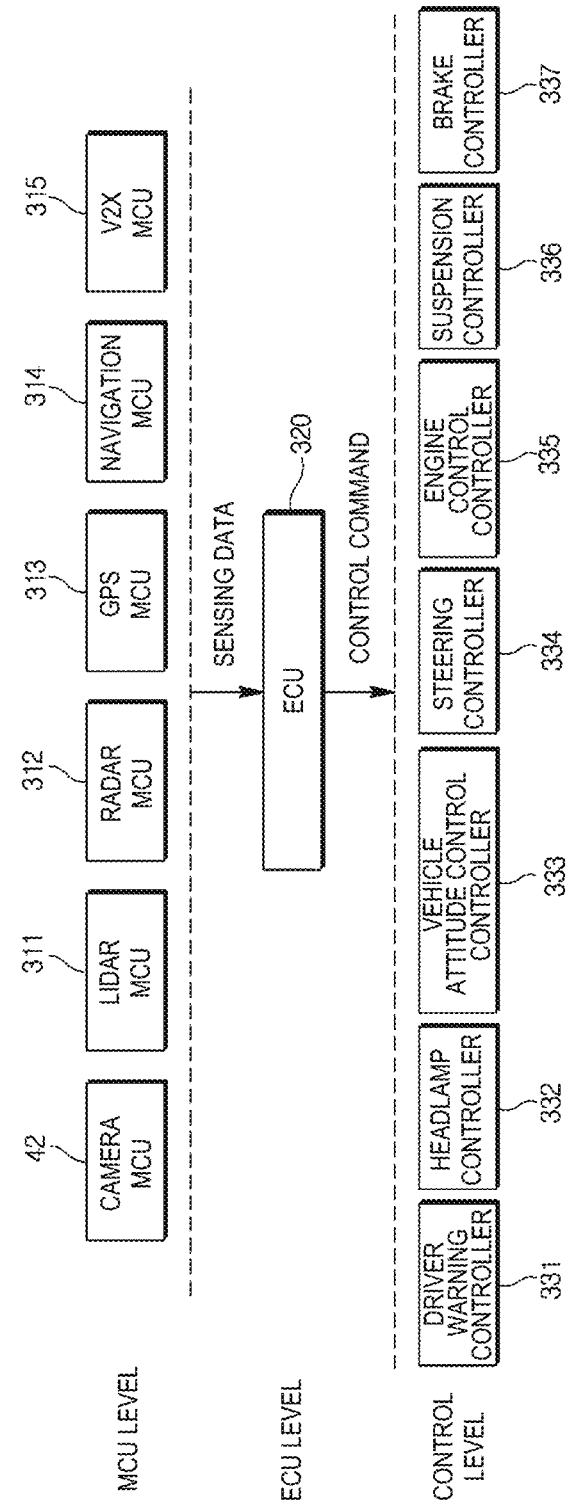
FIG. 3 is a view showing components of the vehicle on which the camera system according to the present disclosure is mounted.

FIG. 3 is a view showing components of the vehicle on which the camera system 1 according to the present disclosure is mounted.

The components of the vehicle may be classified for an MCU level, an ECU level, and a controller level.

The MCU level includes the camera MCU 42 and also includes a light detection and ranging (LiDAR) MCU, a radar MCU, a global positioning system (GPS) MCU, a navigation MCU, a vehicle to everything (V2X) MCU, and the like. The MCUs belonging to the MCU level control a sensor connected thereto or a device (e.g., a processor) connected to the sensor and receive data from the sensor or the device connected to the sensor.

Regarding the camera MCU 42, for example, the image sensor 31 detects the image of the subject captured through the lens 10, the image processor 41 receives and processes the data from the image sensor 31, and the camera MCU 42 receives the data from the image processor 41. The camera MCU 42 controls the image sensor 31 and the image processor 41, wherein the control includes, for example, power supply control, reset control, clock (CLK) control, data communication control, power control, memory control, and the like. Meanwhile, the image processor 41 may process the data detected by and output from the image sensor 31, wherein the process may include enlarging an image of the detected front object or focusing on an object region among the entire forward field of view.

Regarding the LiDAR MCU 311, for example, the LiDAR MCU 311 is connected to a LiDAR device that is a sensor. The LiDAR device may be composed of a laser transmission module, a laser detection module, a signal collection and processing module, and a data transmission/reception module, and a laser light source uses laser light having a wavelength or a variable wavelength in a wavelength range of 250 nm to 11 μm. In addition, the LiDAR device is classified into a time of flight (TOF) type and a phase shift type according to a modulation method of a signal. The LiDAR MCU 311 controls the LiDAR device and another device (e.g., a LiDAR processor (not shown) for processing a LiDAR detection output) connected to the LiDAR device. Such control includes, for example, power supply control, reset control, clock (CLK) control, data communication control, memory control, and the like. Meanwhile, the LiDAR device is used to detect a forward region of the vehicle. Such a LiDAR device is positioned on an inner front surface of the vehicle, specifically, under the windshield 220 to transmit and receive laser light through the windshield.

Regarding the radar MCU 312, for example, the radar MCU 312 is connected to the radar device that is a sensor. The radar device is a sensor that uses electromagnetic waves to measure a distance, speed, or angle of an object. When the radar device is used, it is possible to detect an object up to 150 m ahead in a horizontal angle range of 30° using a frequency modulation carrier wave (FMCW) or pulse carrier method. The radar MCU 312 controls the radar device and another device (e.g., the radar processor (not shown) for processing the radar detection output) connected to the radar device. Such control includes, for example, power supply control, reset control, clock (CLK) control, data communication control, memory control, and the like. Meanwhile, the radar device representatively uses a radar in a 77 GHz band or another suitable band and detects the forward region of the vehicle. Information obtained from the radar device may be used for the ADAS technology such as the ACC. Meanwhile, the radar processor may process data detected by and output from the radar device, wherein the process may include enlarging an image of the detected front object or focusing on an object region among the entire forward field of view.

Regarding the GPS MCU 313, for example, the GPS MCU 313 is connected to a GPS device that is a sensor. The GPS device is a device capable of measuring a position, speed, and time of a vehicle using communication with satellites. Specifically, the GPS device is a device for measuring delay times of radio waves emitted from satellites and obtaining a present position from a distance from an orbit. The GPS MCU 313 controls the GPS device and another device (e.g., a GPS processor (not shown) for processing a GPS detection output) connected to the GPS device. Such control includes, for example, power supply control, reset control, clock (CLK) control, data communication control, memory control, and the like.

Regarding the navigation MCU 314, for example, the navigation MCU 314 is connected to a navigation device that is a sensor. The navigation device is a device for displaying map information through a display device installed on a front portion inside the vehicle. Specifically, the map information is stored in a memory device, and a present position of a vehicle measured through a GPS device is displayed on map data. The navigation MCU 314 controls the navigation device and another device (e.g., a navigation processor (not shown) for processing a navigation detection output) connected to the navigation device, wherein the control includes, for example, power supply control, reset control, clock (CLK) control, data communication control, memory control, and the like.

Regarding the V2X MCU 315, for example, the V2X MCU 315 is connected to a V2X device that is a sensor. Specifically, the V2X device is a device for performing vehicle-to-vehicle communication (V2V), vehicle-to-infrastructure communication (V2I), and vehicle-to-mobile communication (V2N). The V2X MCU 315 controls the V2X device and another device (e.g., a V2X processor (not shown) for processing a V2X detection output) connected to the V2X device, wherein the control includes, for example, power supply control, reset control, clock (CLK) control, data communication control, memory control, and the like.

The ECU 320 belonging to the ECU level is a device for integrally controlling a plurality of electronic devices used in a vehicle. For example, the ECU 320 may control all the MCUs belonging to the MCU level and controllers belonging to the controller level. The ECU 320 receives sensing data from the MCUs, generates a control command for controlling the controller according to situations, and transmits the control command to the controllers. Meanwhile, in the specification, the ECU level is described as a level that is higher than the MCU level for convenience of description, but one MCU among the MCUs belonging to the MCU level may also serve as the ECU, and two MCUs may also be coupled to serve as the ECU.

The controller level includes a driver warning controller 331, a headlamp controller 332, a vehicle attitude control controller 333, a steering controller 334, an engine controller 335, a suspension controller 336, and a brake controller 337, and the like. The controller controls components of the vehicle based on the control command received from the ECU 320.

Regarding the driver warning controller 331, for example, the driver warning controller 331 generates an audio, video, or haptic warning signal to warn the driver of a specific dangerous situation. For example, in order to output a warning sound, the driver warning controller 331 may output the warning sound using a sound system of the vehicle. Alternatively, in order to display a warning message, the driver warning controller 331 may output the warning message through a head up display (HUD) or a side mirror display. Alternatively, in order to generate a warning vibration, the driver warning controller 331 may operate a vibration motor mounted on a steering wheel.

Regarding the headlamp controller 332, for example, the headlamp controller 332 controls a headlamp positioned on a front portion of the vehicle to secure the driver's forward field of view of the vehicle at night. For example, the headlamp controller 332 performs high beam control, low beam control, left and right auxiliary lamp control, adaptive headlamp control, and the like.

Regarding the vehicle attitude controller 333, for example, the vehicle attitude control controller 333 is referred to as vehicle dynamic control (VDC) device, electrical stability control (ESP) device, or the like and performs control of correcting the vehicle's attitude through the intervention of electronic equipment when the vehicle's attitude becomes rapidly unstable due to the driver's sudden operation of the steering wheel, a state of a road surface, or the like. For example, when sensors, such as a wheel speed sensor, a steering angle sensor, a yaw rate sensor, and a cylinder pressure sensor, detect an operation of the steering wheel, and when proceeding directions of wheels and the steering wheel are misaligned, the vehicle attitude control controller 333 performs control of distributing a braking force of each wheel using an anti-locking brake system (ABS) or the like.

Regarding the steering controller 334, for example, the steering controller 334 performs control for a motor driven power steering (MPDS) for driving the steering wheel. For example, when a vehicle collision is expected, the steering controller 334 controls the steering of the vehicle in a direction in which the collision can be avoided or damage can be minimized.

Regarding the engine control controller 335, for example, when the ECU 32 receives data from an oxygen sensor, an air volume sensor, and a manifold absolute pressure sensor, the engine control controller 335 serves to control components, such as an injector, a throttle valve, a spark plug, and the like according to control commands thereof.

Regarding the suspension controller 336, for example, the suspension controller 336 is a device for performing motor-based active suspension control. Specifically, the suspension controller 336 variably controls a damping force of a shock absorber to provide a soft ride during normal traveling and provide a hard ride during high-speed traveling and attitude change, thereby securing ride comfort and traveling stability. In addition, the suspension controller 336 may perform height control, attitude control, and the like as well as damping force control.

Regarding the brake controller 337, for example, the brake controller 337 controls whether the brake of the vehicle is activated and controls a pedal force of the brake. For example, when a frontal collision is predicted, the brake controller 337 controls an emergency brake to be automatically operated according to the control command of the ECU 320 regardless of whether the driver has operated the brake.

Meanwhile, according to the contents described with reference to the drawing, each of the MCU, the ECU, and the controller have been described as an independent component, but it should be understood that the MCU, the ECU, and the controller are not necessarily limited thereto. Two or more MCUs may be integrated into one MCU, the two or more MCUs may be interworked with each other, the two or more MCUs and the ECU may be integrated into one device, two or more controllers may be integrated into one controller, two or more controllers may be interworked with each other, and the two or more controllers and the ECU may be integrated into one device.

For example, the radar processor may process an output of the radar device, and the image processor 41 may process an output of the image sensor 31, wherein the output of the radar device and the output of the image sensor 31 may be interworked by one processor (the radar processor, the image processor 41, the integrated processor, or the ECU 320). For example, the radar processor may process data detected by and output from the radar device, and based on information on a front object derived as a result of the processing, the image processor 41 may perform processing of enlarging or focusing on the data detected by and output from the image sensor 31. Conversely, the image processor 41 may process the data detected by and output from the image sensor 31, and based on information on a front object derived as a result of the processing, the radar processor may perform processing of enlarging or focusing on the data detected by and output from the radar device. To this end, the radar MCU may control the radar device to perform beam aiming or beam selection. Alternatively, the radar processor may perform digital beam forming or digital beam steering in an array antenna or a phase array antenna system. As described above, when the radar device and the front camera are interworked with each other, the image sensor 31 and the radar device may be disposed on the same board (e.g., the image PCB 30).

Figure 4A:
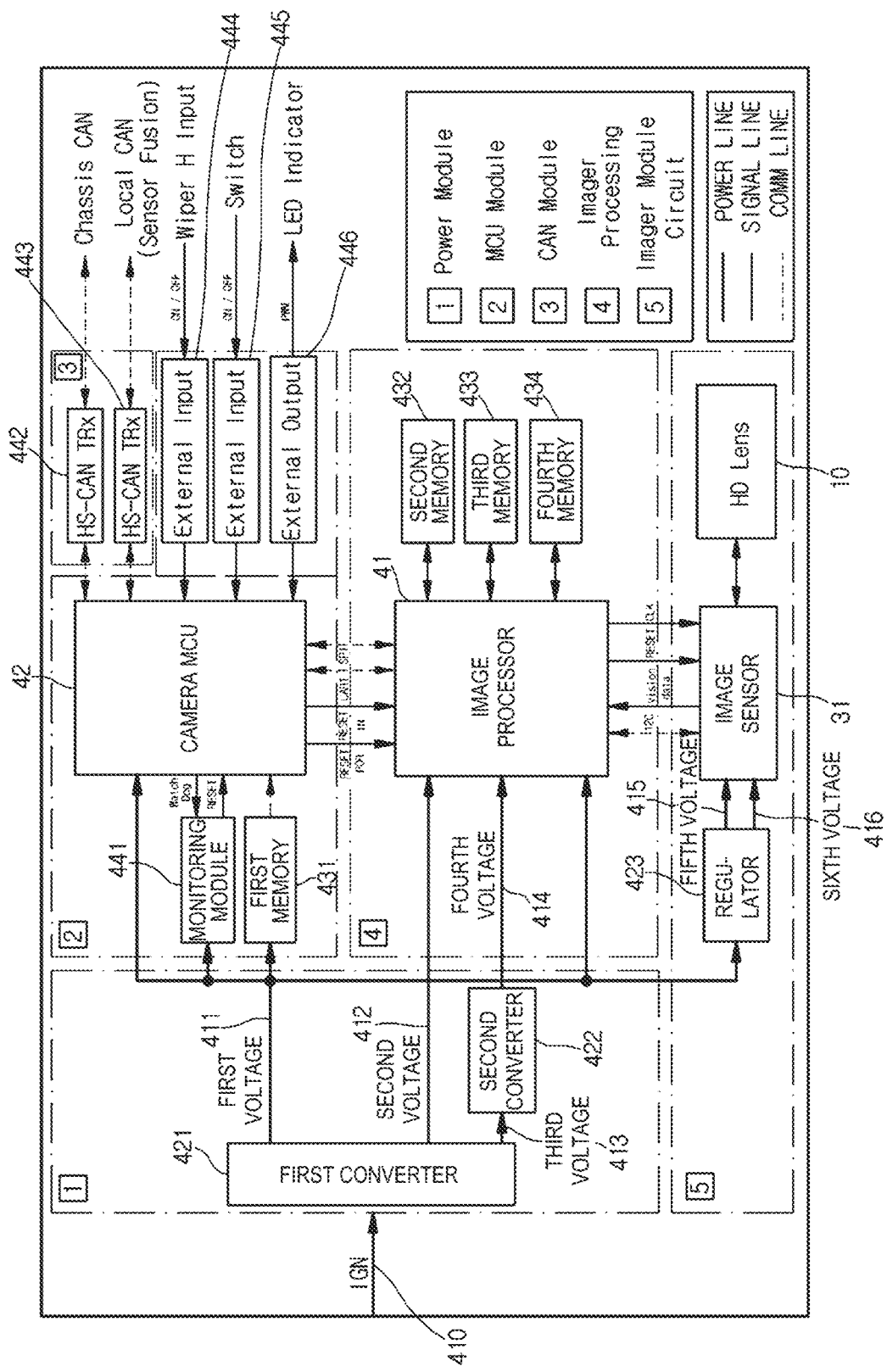
FIG. 4 is a view showing components of the camera system according to the present disclosure.
Figure 4B:
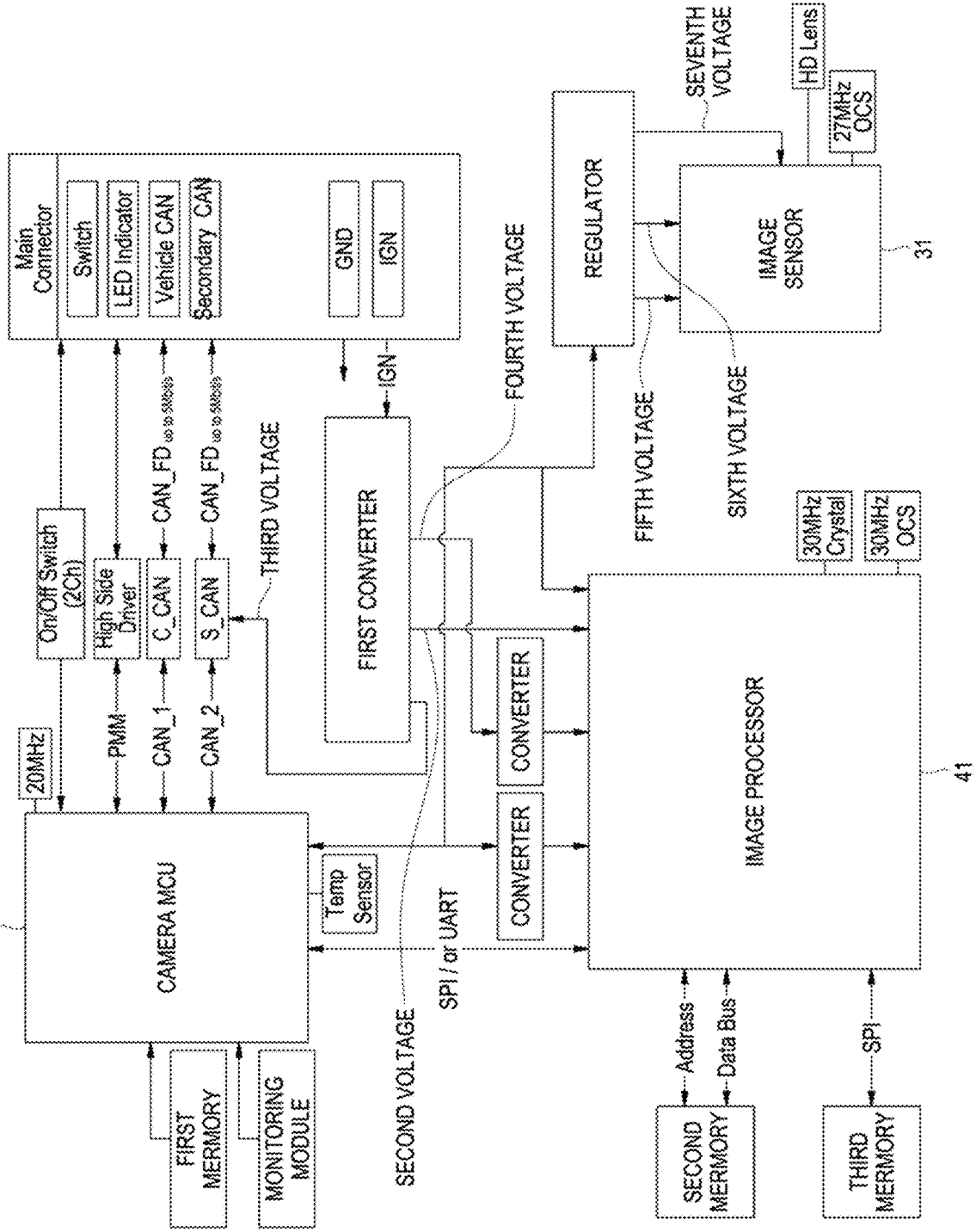

FIG. 4 is a view showing components of the camera system 1 according to the present disclosure.

Referring to FIG. 4, the camera system 1 includes the lens 10, the image sensor 31, the image processor 41, and the camera MCU 42.

In addition, the camera system 1 includes a first converter 421 for receiving an ignition voltage 410 and converting the received ignition voltage 410 into a first voltage 411, a second voltage 412, and a third voltage 413, a second converter 422 for receiving the third voltage 413 and converting the received third voltage 413 into two fourth voltages 414, and a third converter 423 for receiving the first voltage 411 and converting the received first voltage 411 into a fifth voltage 415 and a sixth voltage 416. The first converter 421 may be a 3ch DC-DC converter, and the third converter (regulator) 423 may be a 2ch low drop out (LDO) converter. The reason why the third converter 423 is implemented as the LDO converter is that a current level required by the image sensor 31 is not large.

The ignition voltage 410 is a voltage generated when a driver manually turns a key to start a vehicle or starts the vehicle with a button and may be generally 14 V. The first voltage 411 is a voltage converted by the first converter 421 receiving the ignition voltage 410 and may be 3.3 V. The first voltage 411 may be input to the camera MCU 42 and used as operating power of the camera MCU 42. In addition, the first voltage 411 may be used as operation power for a monitoring module 441 and a first memory 431. In addition, the first voltage 411 may be used as operation power of the image processor 41. The reason why the first voltage 411, which is the same operation power, is applied to the camera MCU 42 and the image processor 41 is for matching communication levels (10 voltages) between the two communication components. The second voltage 412 is a voltage converted by the first converter 421 receiving the ignition voltage 410 and may be 1.8 V. Meanwhile, as will be described below, the fifth voltage (e.g., 1.8 V) is applied to the image sensor 31, and this voltage is the same as the second voltage. The reason why the second voltage 412 applied to the image processor 41 and the fifth voltage 215 applied to the image sensor 31 are the same is for matching communication levels (10 voltages) between the image processor 41 and the image sensor 31. The third voltage 413 is a voltage converted by the first converter 421 receiving the ignition voltage 410 and may be 5 V. The third voltage 413 is applied to the second converter 422, and the second converter 422 may output the fourth voltage 414. The fourth voltage 414 is applied to the image processor 41 to serve as core power of the image processor 41. Meanwhile, although the first converter 421 may directly output the fourth voltage 414, the reason why the first converter 421 outputs the third voltage 413 and the second converter 422 receiving the third voltage 413 outputs the fourth voltage 414 is for satisfying an allowable current required by the image processor 41. In addition, the reason is for using the third voltage 413 as operation power in other components (e.g., high-speed CAN transceiver (HS-CAN TRx) and the like).

Meanwhile, the first voltage 411 is applied to the third converter 423, and the third converter 423 outputs the fifth voltage 415 and the sixth voltage 416. The fifth voltage 415 may be 1.8 V, and the sixth voltage 416 may be 2.8 V. The fifth voltage 415 is applied to the image sensor 31 to serve to match the communication level with the image processor 41. The sixth voltage 416 is applied to the image sensor 31 to serve as core power of the image sensor 31. As a result, the communication levels between the camera MCU 42 and the image processor 41 match 3.3 V, and the communication levels between the image processor 41 and the image sensor 31 match 1.8 V.

In addition, the camera system 1 includes the first memory 431 for receiving the first voltage 411 and connected to the camera MCU 42, a second memory 432 connected to the image processor 41, a third memory 433 connected to the image processor 41, and a fourth memory 434 connected to the image processor 41. The first memory 431 may be an electrically erasable programmable ROM (EEPROM), the second memory 432 may be a low power double data rate 2 (LPDDR2), the third memory 433 may be the LPDDR2, and the fourth memory 434 may be a flash memory. The first memory 431 is connected to the camera MCU 42 and stores MCU logic data (algorithm for controlling the controller) and MCU basic software (start-up algorithm for driving the image processor 41, the image sensor 31, and the like). The second memory 432 is connected to the image processor 41 and serves to execute a function implementation algorithm stored in the fourth memory 434 according to the command of the image processor 41. The third memory 433 is connected to the image processor 41 and serves to execute the function implementation algorithm stored in the fourth memory 434 according to the command of the image processor 41. The fourth memory 434 is connected to the image processor 41 and stores algorithm data (e.g., lane detection (LD), pedestrian detection (PD), VD, and traffic sign recognition (TSR)) implementing functions in the image processor 41. Meanwhile, capacities of the second memory 432 and the third memory 433 may be determined according to the number of functions supported by the camera system 1. For example, when only some of the functions are supported (when the data processed by the image processor 41 are data on the preceding vehicle, data on front lane line, data on the front cyclist, data on the traffic signs, data on the wheel detection, data on the traffic lights, data on the active high beam control, and data on the road markings (e.g., arrows on the road)), the second memory 432 and the third memory 433 may each have a size of 128 MB, and when more functions are supported (when the data processed by the image processor 41 are data on the VD at any angle and the road profiles, data on the semantic free space (e.g., boundary labeling), data on the general objects (side vehicles and the like), data on the advanced path planning, data on the advanced traffic signs, and data on the odometry (e.g., map matching) in addition to the above-described examples), the second memory 432 and the third memory 433 may each have a size of 256 MB. In addition, the second memory 432 and the third memory 33 may also be integrated into one memory according to the number of lenses 10. When only one lens 10 is used, a total of two memories (e.g., 2×128 MB) of the second memory 432 and the third memory 433 may be used, and when two lenses 10 are used, one memory (e.g., 1×512 MB) having a larger capacity than that of the two memories being used may be used. In addition, when three lenses 10 are used, two memories having a larger capacity (e.g., 2×512 MB) may be used. That is, the number and capacities of the second memory 432 and the third memory 433 may be changed depending on the number of lenses.

In addition, the camera system 1 includes the monitoring module 441 connected to the camera MCU 42, a HS-CAN_TRx 442 connected to the camera MCU 42 to perform chassis CAN communication, a HS-CAN_TRx 443 connected to the camera MCU 42 to perform local CAN communication, an external input device 444 connected to the camera MCU 42 to receive a wiper operation input, an external input device 445 connected to the camera MCU 42 to receive an ON/OFF switching input, and an external output device 446 connected to the camera MCU 42 to output a light emitting diode (LED) signal. The reason why the camera MCU 42 receives the wiper operation input is that since a case in which a wiper ON signal is received is a rainy situation, thereby degrading forward recognition through the camera system 1, it is necessary to turn off the operation of the camera MCU 42 or turning off a specific function of the camera MCU 42.

The camera system 1 may be used to implement a function of at least one of road boundary departure prevention systems (RBDPS), cooperative adaptive cruise control systems (CACC), vehicle/roadway warning systems, partially automated parking systems (PAPS), partially automated lane change systems (PALS), cooperative forward vehicle emergency brake warning systems (C-FVBWS), lane departure warning systems (LDWS), pedestrian detection and collision mitigation systems (PDCMS), curve speed warning systems (CSWS), lane keeping assistance systems (LKAS), adaptive cruise control systems (ACC), forward vehicle collision warning systems (FVCWS), maneuvering aids for low speed operation systems (MALSO), lane change decision aid systems (LCDAS), low speed following systems (LCDAS), full speed range adaptive cruise control systems (FSRA), forward vehicle collision mitigation systems (FVCMS), extended range backing aids systems (ERBA), cooperative intersection signal information and violation warning systems (CIWS), and traffic impediment warning systems (TIWS).

The camera MCU 42 may identify nearby objects (e.g., other vehicles, pedestrians, and cyclists) of the vehicle, lane lines of lanes, and free spaces based on the image data of the image processor 41, the LiDAR data of the LiDAR MCU 311, or the radar data of the radar MCU 312.

The camera MCU 42 may identify relative positions (distances from the vehicle and angles to the traveling direction) and classification (e.g., whether the objects are other vehicles, pedestrians, or cyclists) of the objects in front of the vehicle based on the image data. The processor 41 may identify relative positions and relative speeds of the objects in front of the vehicle based on the radar data and LiDAR data. In addition, the camera MCU 42 may match the objects identified based on the radar data with the objects identified based on the image data and the objects identified based on the LiDAR data and acquire the classification, the relative positions, and the relative speeds of the nearby objects of the vehicle based on the matching of the objects.

The camera MCU 42 may estimate a position of the vehicle using a high-definition map (HD map), the image data, the radar data, and the LiDAR data stored in the memory. For example, the camera MCU 42 may identify distances to a plurality of landmarks of the HD map based on LiDAR data and identify an absolute position of the vehicle based on the distances to the plurality of landmarks.

The camera MCU 42 may project the nearby objects of the vehicle on the HD map based on the image data, the radar data, and the LiDAR data. The camera MCU 42 may project the nearby objects of the vehicle on the HD map based on the absolute position of the vehicle and the relative positions of the objects.

The camera MCU 42 may evaluate a risk of collision between the vehicle and the nearby objects based on the relative positions and the relative speeds of the nearby objects of the vehicle. For example, the camera MCU 42 may calculate a time to collision (TTC) (or a distance to collision (TTD)) between the vehicle and the nearby objects based on the positions (distances) and the relative speeds of the nearby objects of the vehicle and evaluate the risk of collision between the vehicle and the nearby objects based on the TTC. The camera MCU 42 may determine that the risk of collision is higher as the TTC is shorter.

The camera MCU 42 may select a target object among the nearby objects of the vehicle based on the risk of collision. For example, the camera MCU 42 may select the target object based on the TTC between the vehicle and the nearby objects.

The camera MCU 42 may generate a driving signal, a braking signal, and a steering signal based on the risk of collision with the target object. For example, the camera MCU 42 may warn the driver of the collision or transmit the braking signal to the brake controller 337 based on a comparison between the TTC between the vehicle and the target objects and a reference time. In addition, the camera MCU 42 may transmit the steering signal to the steering controller 334 to avoid the collision with the target object based on the comparison between the TTC between the vehicle and the target objects and the reference time.

Figure 5:
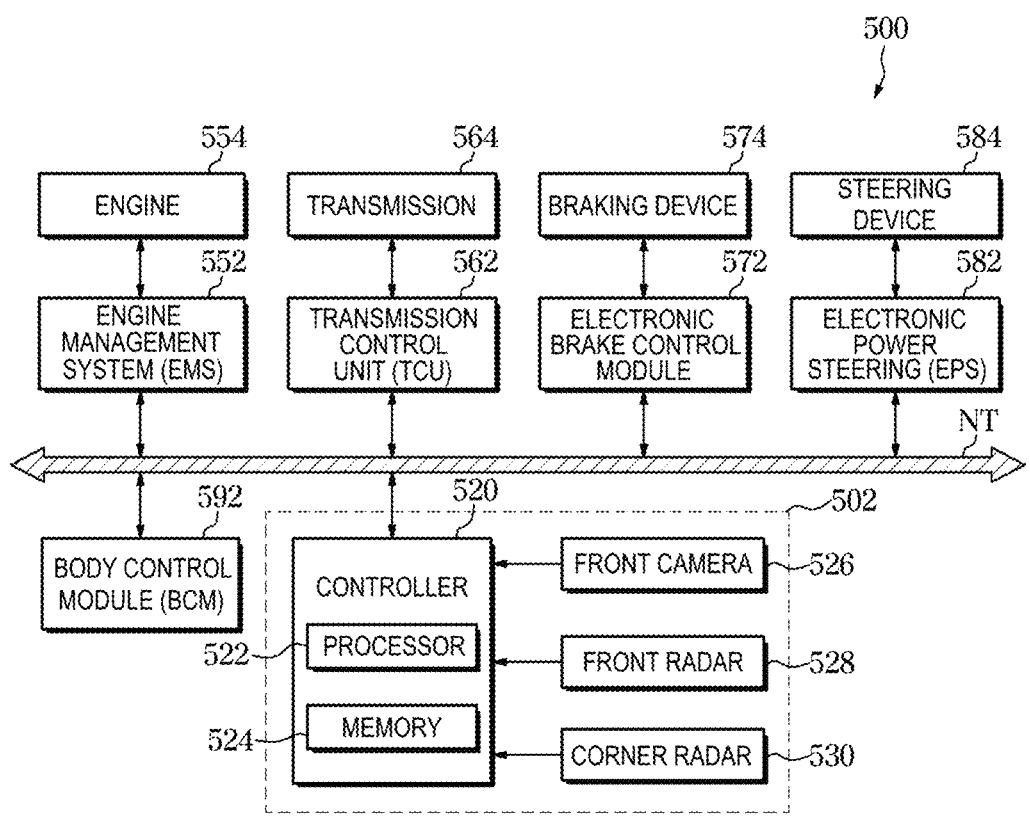
FIG. 5 is a view showing a configuration of the vehicle according to one embodiment of the present disclosure.

FIG. 5 is a view showing a configuration of the vehicle according to one embodiment of the present disclosure.

As shown in FIG. 5, a vehicle 500 includes an engine 554, a transmission 564, a braking device 574, and a steering device 584. The engine 554 may include cylinders and pistons and generate power for the vehicle 500 to travel. The transmission 564 may include a plurality of gears and transmit the power generated by the engine 554 to wheels. The braking device 574 may decelerate the vehicle 500 or stop the vehicle 500 through friction with the wheels. The steering device 584 may change the traveling direction of the vehicle 500.

The vehicle 500 may include a plurality of electronic components. For example, the vehicle 500 further includes an engine management system (EMS) 552, a transmission control unit (TCU) 562, an electronic brake control module 572, an electronic power steering (EPS) 582, a body control module (BCM) 592, and a driver assistance system (DAS) 502.

The EMS 552 may control the engine 554 in response to a driver's acceleration intention through an accelerator pedal or a request of the DAS 502. For example, the EMS 552 may control a torque of the engine 554. The EMS 552 may include the engine control controller 335 described above with reference to FIG. 3.

The TCU 562 may control the transmission 564 in response to a driver's transmission command through a transmission lever and/or a traveling speed of the vehicle 500. For example, the TCU 562 may adjust a transmission ratio from the engine 554 to the wheels.

The electronic brake control module 572 may control the braking device 574 in response to a driver's braking intention through a brake pedal and/or slip of the wheels. For example, the electronic brake control module 572 may temporarily release the braking of the wheels in response to the slip of the wheels detected when the vehicle 500 is braked (ABS). The electronic brake control module 572 may selectively release the braking of the wheels in response to oversteering and/or understeering detected during steering of the vehicle 500 (ESC). In addition, the electronic brake control module 572 may temporarily brake the wheels in response to the slip of the wheels detected during driving of the vehicle 500 (traction control system (TCS)). The electronic brake control module 572 may include the brake controller 337 described above with reference to FIG. 3.

The EPS 582 may assist an operation of the steering device 584 in response to a driver's steering intention through the steering wheel so that the driver may easily operate the steering wheel. For example, the EPS 582 may assist the operation of the steering device 584 to reduce a steering force during low-speed traveling or parking and increase the steering force during high-speed traveling. The EPS 582 may include the steering controller 334 described above with reference to FIG. 3.

The BCM 592 may control operations of the electronic components for providing convenience to the driver or guaranteeing the safety of the driver. For example, the BCM 592 may control headlamps, wipers, clusters, multi-function switches, turn signal lamps, and the like. The BCM 592 may include the driver warning controller 331 and the headlamp controller 332 described above with reference to FIG. 3.

The DAS 502 may assist the driver in operating (driving, braking, and steering) the vehicle 500. For example, the DAS 502 may detect environments (e.g., other vehicles, pedestrians, cyclists, lane lines, and traffic signs, and the like) around the vehicle 500 and control the driving, braking, and/or steering of the vehicle 500 in response to the detected environment.

The DAS 502 may provide various functions to the driver. For example, the DAS 502 may provide LDW, LKA, high beam assist (HBA), AEB, TSR, smart cruise control (SCC), blind spot detection (BSD), and the like.

The DAS 502 may include a front camera 526, a front radar 528, and a plurality of corner radars 530. The front camera 526, the front radar 528, and the plurality of corner radars 530 may be vehicle detection devices for detecting positions, directions, speeds, and the like of other vehicles around the host vehicle 500.

The front camera 526 may have a forward field of view of the vehicle 500. The front camera 526 may be, for example, installed on a front windshield of the vehicle 500.

The front camera 526 may capture a forward image of the vehicle 500 and acquire image data on the forward image of the vehicle 500. The image data on the forward image of the vehicle 500 may include position information on other vehicles, pedestrians, cyclists, or lane lines positioned in front of the vehicle 500.

The front camera 526 may include a plurality of lenses and an image sensor. The image sensor may include a plurality of photodiodes for converting light into electrical signals, and the plurality of photodiodes may be disposed in a two-dimensional matrix.

The front camera 526 may be electrically connected to a controller 520. For example, the front camera 526 may be connected to the controller 520 via a vehicle communication network NT, connected to the controller 520 via a hard wire, or connected to the controller 520 via a PCB. The front camera 526 may be controlled by communication between the camera MCU 42 and the controller 520 described above with reference to FIG. 3.

The front camera 526 may transmit the image data on the forward image of the vehicle 500 to the controller 520.

The front radar 528 may have a forward field of sensing of the vehicle 500. The front radar 528 may be, for example, installed on a grille or a bumper of the vehicle 500.

The front radar 528 may include a transmission antenna (or a transmission antenna array) for radiating transmission radio waves in a forward direction of the vehicle 500 and a reception antenna (or a reception antenna array) for receiving reflection radio waves reflected by an object. The front radar 528 may acquire forward radar data from the transmission radio waves transmitted by the transmission antenna and the reflected radio waves received by the reception antenna. The forward radar data may include distance information and speed information on other vehicles, pedestrians, or cyclists positioned in front of the vehicle 500. The front radar 528 may calculate a state distance to the object based on a phase difference (or a time difference) between the transmission radio wave and the reflection radio wave and calculate a relative speed of the object based on a frequency difference between the transmission radio wave and the reflection radio wave.

The front radar 528 may be, for example, connected to the controller 520 via the vehicle communication network NT, the hard wire, or the PCB. The front radar 528 may transmit the forward radar data to the controller 520.

The plurality of corner radars 530 include a first corner radar installed at a front right side of the vehicle 500, a second corner radar installed at a front left side of the vehicle 500, a third corner radar installed at a rear right side of the vehicle 500, and a fourth corner radar installed at a rear left side of the vehicle 500.

The controller 520 includes a processor 522 and a memory 524.

According to one embodiment, the controller 520 is one of a plurality of ECUs provided in the vehicle and may be an ECU in charge of the ADAS of the vehicle. For example, the controller 520 may be the ECU 320 described above with reference to FIG. 3. The controller 520 may acquire position information of another vehicle based on the radar data obtained by the radar provided in the vehicle 500. The position information may be expressed as a coordinate value based on a specific coordinate system or the vehicle 500, and a relative distance, a relative speed, and the like between the vehicle 500 and another vehicle may be calculated based on the coordinate value. When the relative distance and the relative speed are calculated, the controller 520 may calculate a degree of the risk of collision based on the calculated relative distance and relative speed. For example, the controller 520 may calculate the degree of the risk of collision as high when the relative distance between the vehicle 500 and another vehicle is smaller than a preset distance. The degree of the risk of collision refers to a scale of the possibility of collision between the vehicle 500 and another vehicle. The controller 520 may generate a signal notifying the driver of a collision warning when the value of the degree of the risk of collision is greater than or equal to a preset value.

Meanwhile, the controller 520 may generate a first region of interest partitioned along a predicted traveling path of the vehicle 500 in order to calculate the degree of the risk of collision more accurately and generate a second region of interest only when another vehicle is detected within the first region of interest. Here, the second region of interest is a new region of interest generated after the vehicle 500 moves a predetermined distance along the predicted traveling path. The controller 520 measures a relative distance to another vehicle only when another vehicle is detected within the second region of interest and calculates the degree of the risk of collision based on the measured relative distance.

The processor 522 of the controller 520 may process the forward image data of the front camera 526, the forward radar data of the front radar 528, and the corner radar data of the plurality of corner radars 530 and generate a braking signal and a steering signal for controlling the braking device 574 and the steering device 584. For example, the processor 522 may include an image signal processor for processing the forward image data of the front camera 526, a digital signal processor for processing the radar data of the radars 528 and 130, and/or a MCU for generating the braking signal and the steering signal.

The processor 522 of the controller 520 may detect front objects (e.g., other vehicles, pedestrians, cyclists, and the like) of the vehicle 500 based on the forward image data of the front camera 526.

Specifically, the processor 522 of the controller 520 may acquire position information (distances and directions) and speed information (relative speeds) of the objects in front of the vehicle 500 based on the forward radar data of the front radar 528. The processor 522 of the controller 520 may acquire the position information (directions) and type information (e.g., whether the objects are other vehicles, pedestrians, cyclists, or the like) of the objects in front of the vehicle 500 based on the forward image data of the front camera 526. In addition, the processor 522 of the controller 520 may match the objects detected by the forward image data with the objects detected by the forward radar data and acquire type information, position information, and speed information of the objects in front of the vehicle 500 based on a result of the matching.

The processor 522 of the controller 520 generates a braking signal and a steering signal based on the type information, the position information, and the speed information of the front objects of the vehicle 500.

For example, the processor 522 of the controller 520 may calculate a TTC between the vehicle 500 and the front objects based on the position information (distances) and the speed information (relative speeds) of the front objects and warn the driver of a collision or transmit the braking signal to the electronic brake control module 572 based on a result of the comparison between the TTC and a predetermined reference time. The processor 522 may output a warning via an audio and/or a display in response to a TTC that is shorter than a predetermined first reference time. The processor 522 may transmit a pre-braking signal to the electronic brake control module 572 in response to a TTC that is shorter than a predetermined second reference time. The processor 522 may transmit a sudden braking signal to the electronic brake control module 572 in response to a TTC that is shorter than a predetermined third reference time. In this case, the second reference time is shorter than the first reference time, and the third reference time is shorter than the second reference time.

As another example, the processor 522 of the controller 520 may calculate a DTC based on the speed information (relative speeds) of the front objects and warn the driver of a collision or transmit the braking signal to the electronic brake control module 572 based on a result of the comparison between the DTC and the distance to the front objects.

The processor 522 of the controller 520 may acquire position information (distances and directions) and speed information (relative speeds) of objects present at sides (a front right side, a front left side, a rear right side, and a rear left side) of the vehicle 500 based on the corner radar data of the plurality of corner radars 530.

The memory 524 of the controller 520 may store a program and/or data for the processor 522 to process the image data, a program and/or data for the processor 522 to process the radar data, and a program and/or data for the processor 522 to process the braking signal and/or the steering signal.

The memory 524 of the controller 520 may temporarily store the image data received from the front camera 526 and/or the radar data received from the radars 528 and 130 and temporarily store processing results of the image data and/or the radar data of the processor 522.

The memory 524 of the controller 520 may include non-volatile memories, such as a flash memory, a ROM, and erasable programmable ROM (EPROM) as well as volatile memories, such as a static RAM (SRAM) and a dynamic RAM (DRAM).

The above components may communicate with each other via the vehicle communication network NT For example, electronic components may exchange data via Ethernet, media oriented systems transport (MOST), Flexray, CAN, local interconnect network (LIN), or the like. For example, the DAS 502 may respectively transmit the driving control signal, the braking signal, and the steering signal to the EMS 552, the electronic brake control module 572, and the EPS 582 via the vehicle communication network NT.

In FIG. 5, the controller 520 of the DAS 502 predicts the possibility of a collision between the host vehicle 500 and another vehicle 800 (see FIGS. 8 to 11) based on a position, a direction, and a speed of another vehicle and calculates an avoidance trajectory for the host vehicle 500 to avoid a collision with another vehicle 800 based on the possibility of a collision between the host vehicle 500 and another vehicle 800, wherein the controller 520 calculates the avoidance trajectory after replacing an actual curved road with a virtual straight road when calculating the avoidance trajectory.

Figure 6:
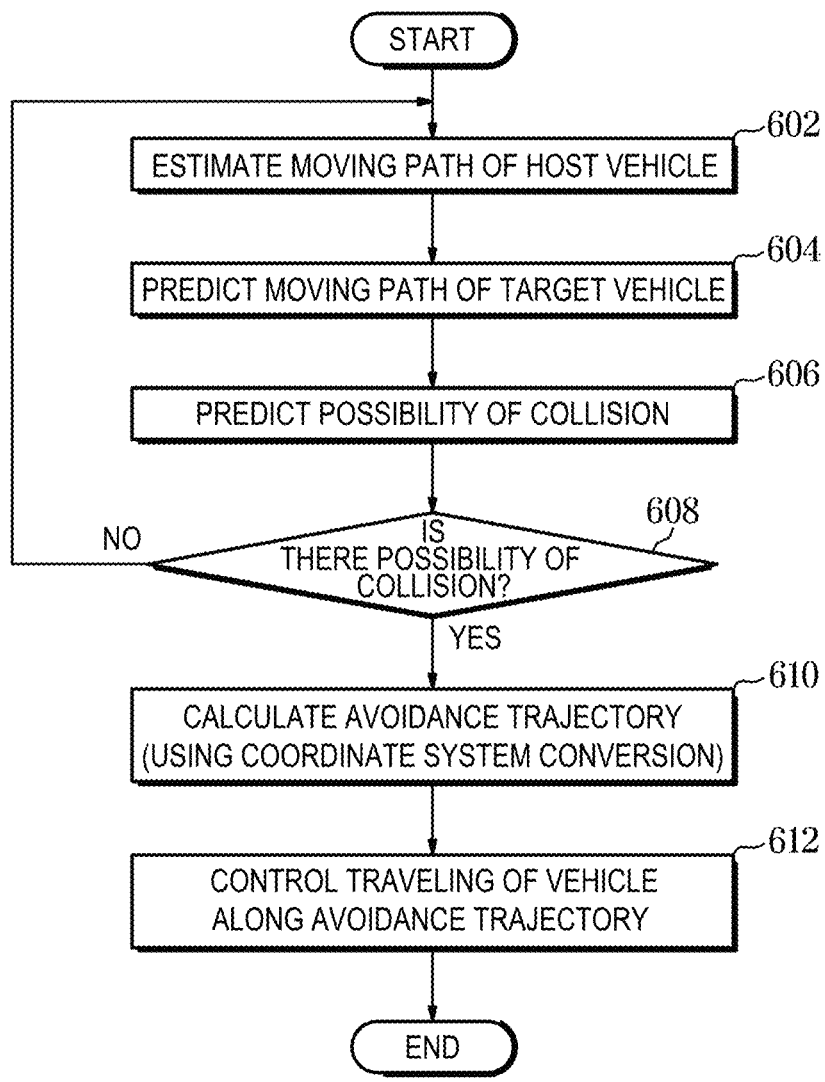
FIG. 6 is a view showing a method of controlling a vehicle according to an embodiment of the present disclosure.
Figure 7:
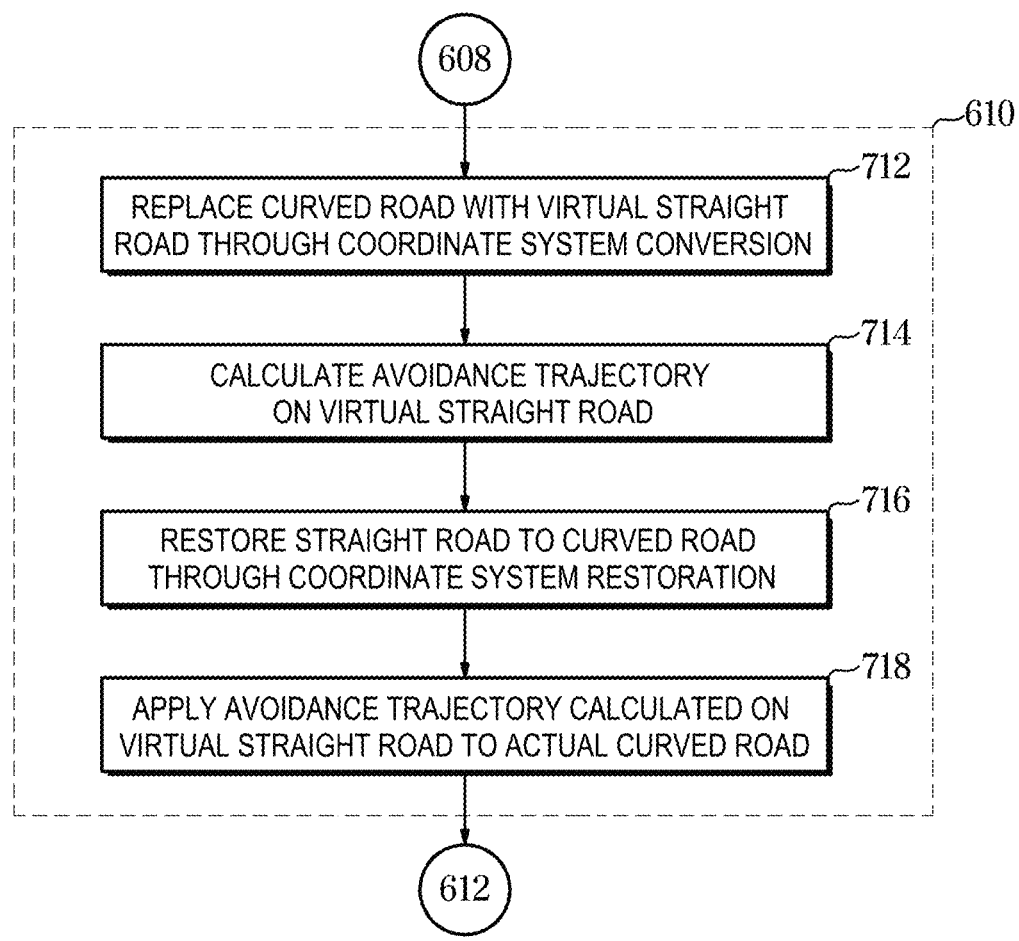
FIG. 7 is a view showing calculating the avoidance trajectory in FIG. 6 in more detail.

A method of controlling a vehicle according to an embodiment of the present disclosure will be described with reference to FIGS. 6 to 11. FIG. 6 is a view showing a method of controlling a vehicle according to an embodiment of the present disclosure. FIG. 7 is a view showing calculating the avoidance trajectory in FIG. 6 in more detail. FIGS. 8 to 11 are views showing various situations of the calculating the avoidance trajectory in FIG. 7. In the following description, "host vehicle" refers to a vehicle (e.g., the vehicle 500 in FIG. 5) to which the present disclosure is applied, and "target vehicle" refers to a target vehicle that the host vehicle intends to avoid.

FIG. 6 is a view showing a method of controlling a vehicle according to the embodiment of the present disclosure. The method of controlling a vehicle shown in FIG. 6 includes predicting the possibility of a collision between the host vehicle 500 and another vehicle 800 (see FIGS. 8 to 11) based on the position, direction, and speed of another vehicle, and calculating the avoidance trajectory for the host vehicle 500 to avoid the collision with another vehicle 800 based on the possibility of the collision between the host vehicle 500 and another vehicle 800, wherein the avoidance trajectory is calculated after replacing the actual curved road with the virtual straight road when calculating the avoidance trajectory.

While the host vehicle 500 according to the embodiment of the present disclosure travels, the controller 520 of the DAS 502 estimates a moving path of the host vehicle 500 (602). That is, the controller 520 estimates which path the host vehicle 500 will move along from a current position in the future from information on a direction (steering angle), a speed, and the like of the host vehicle 500.

When there are other vehicles around the traveling host vehicle 500, the controller 520 of the host vehicle 500 may predict a moving path of a target vehicle (e.g., the target vehicle 800 in FIGS. 8 to 11) that satisfies a preset condition among the nearby other vehicles (604). The preset condition of the target vehicle may be a case in which the corresponding vehicle is positioned on the estimated path of the host vehicle 500. Alternatively, the preset condition of the target vehicle may be a case in which the moving path of the corresponding another vehicle and the estimated path of the host vehicle 500 cross.

Based on the estimated moving path of the host vehicle 500 and the predicted moving path of the target vehicle 800, the possibility of the collision between the host vehicle 500 and the target vehicle 800 is predicted (606). That is, the controller 520 predicts the possibility of the collision between the host vehicle 500 and the target vehicle 800 at any predetermined point (position) while the host vehicle 500 travels along the estimated moving path and the target vehicle 800 travels along the predicted moving path.

When it is predicted that there is the possibility of the collision between the host vehicle 500 and the target vehicle 800 ("Yes" in 608), the controller 520 of the host vehicle 500 calculates the avoidance trajectory, which is a traveling path required for the host vehicle 500 in order to avoid the collision (610). In the embodiment of the present disclosure, in order to calculate the avoidance trajectory, the avoidance trajectory is calculated after replacing the curved road with the virtual straight road, and avoidance maneuver, which is calculated after restoring the virtual straight road back to the original curved road when the calculating of the avoidance trajectory is completed, is performed. In the embodiment of the present disclosure, the actual curved road is replaced with the virtual straight road for calculating the avoidance trajectory because the calculation of the avoidance trajectory on the straight road is relatively simpler and faster than the calculation of the avoidance trajectory on the curved road. The reason is that there are relatively fewer variables to consider for calculating the avoidance trajectory on the straight road compared to the curved road. The calculating the avoidance trajectory according to the embodiment of the present disclosure will be described in more detail with reference to FIGS. 7 to 11 to be described below.

When the calculation of the avoidance trajectory is completed, the controller 520 transmits the braking signal to the electronic brake control module 572 so that the host vehicle 500 travels along the calculated avoidance trajectory and transmits the steering signal to the EPS 582 (612). Under the above-described control of the controller 520, the host vehicle 500 may travel along the calculated avoidance trajectory, thereby avoiding the collision with the target vehicle 800.

FIG. 7 is a view showing the calculating of the avoidance trajectory in FIG. 6 in more detail. The calculating of the avoidance trajectory shown in FIG. 7 is performed assuming that there is the possibility of the collision ("Yes" in 608) as described above with reference to FIG. 6.

The controller 520 of the host vehicle 500 according to the embodiment of the present disclosure replaces the curved road with the virtual straight road through coordinate system conversion (712). This will be described with reference to FIGS. 8 and 9 as follows.

Figure 8:
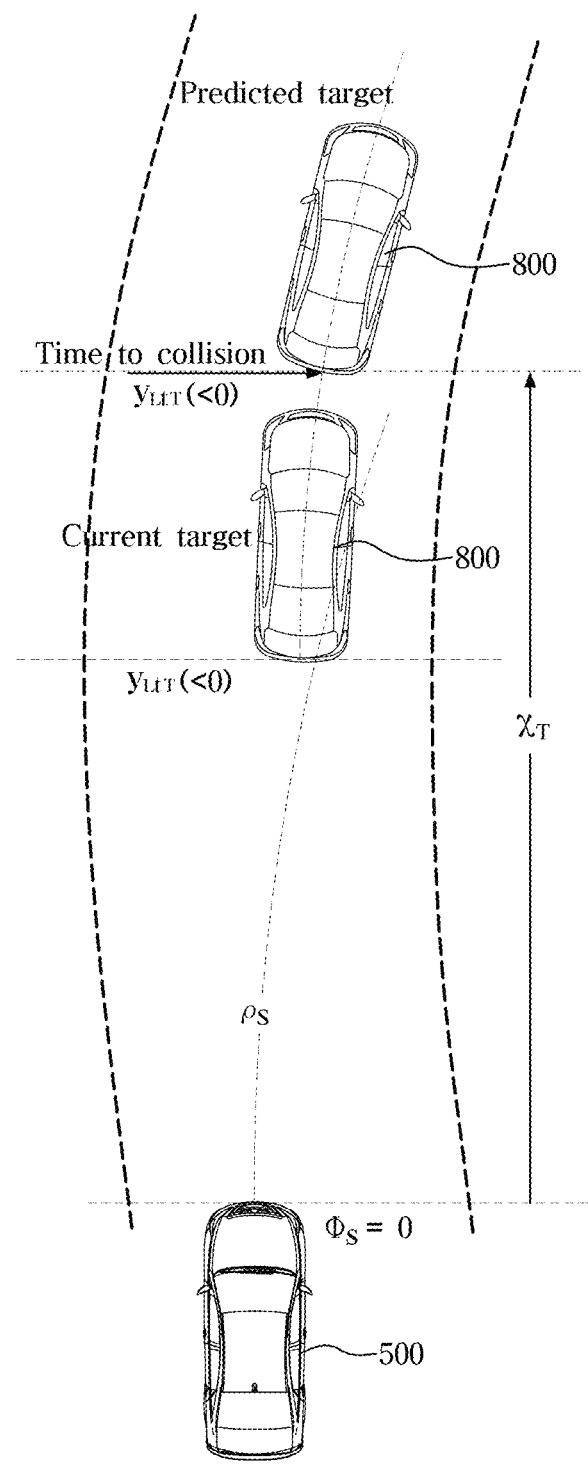
FIG. 8 is a view showing present states of a host vehicle and a target vehicle.

FIG. 8 is a view showing present states of the host vehicle and the target vehicle. As shown in FIG. 8, the target vehicle 800 in which a collision is expected is present in front of the host vehicle 500. The controller 520 of the host vehicle 500 may predict the possibility of the collision between the host vehicle 500 and the target vehicle (another vehicle) 800 from the variable values shown in FIG. 8.

In the situation shown in FIG. 8, a lateral distance y(x), a lane line curvature ρ(x), and a heading angle Ø(x) may each be expressed as follows. The lateral distance y(x) is a lateral distance from a center of the vehicle 500 to a left lane line. The lane line curvature ρ(x) is a curvature of the lane line at the corresponding position. The heading angle Ø(x) is a heading angle with respect to the lane line of the host vehicle 500 at the corresponding position. x denotes a distance from a present position of the host vehicle 500 to an arbitrary position in a longitudinal direction.

$$y(x) = y_0 + \emptyset_0 x + \frac{\rho_0}{2}x^2 + \frac{1}{6}\frac{d\rho}{dx}x^3 \qquad <\text{Equation 1}>$$

$$\rho(x) = \rho_0 + \frac{d\rho}{dx} \cdot x \qquad <\text{Equation 2}>$$

$$\emptyset(x) = \emptyset_0 + \rho_0 x + \frac{1}{2}\frac{d\rho}{dx}x^2 \qquad <\text{Equation 3}>$$

Figure 9:
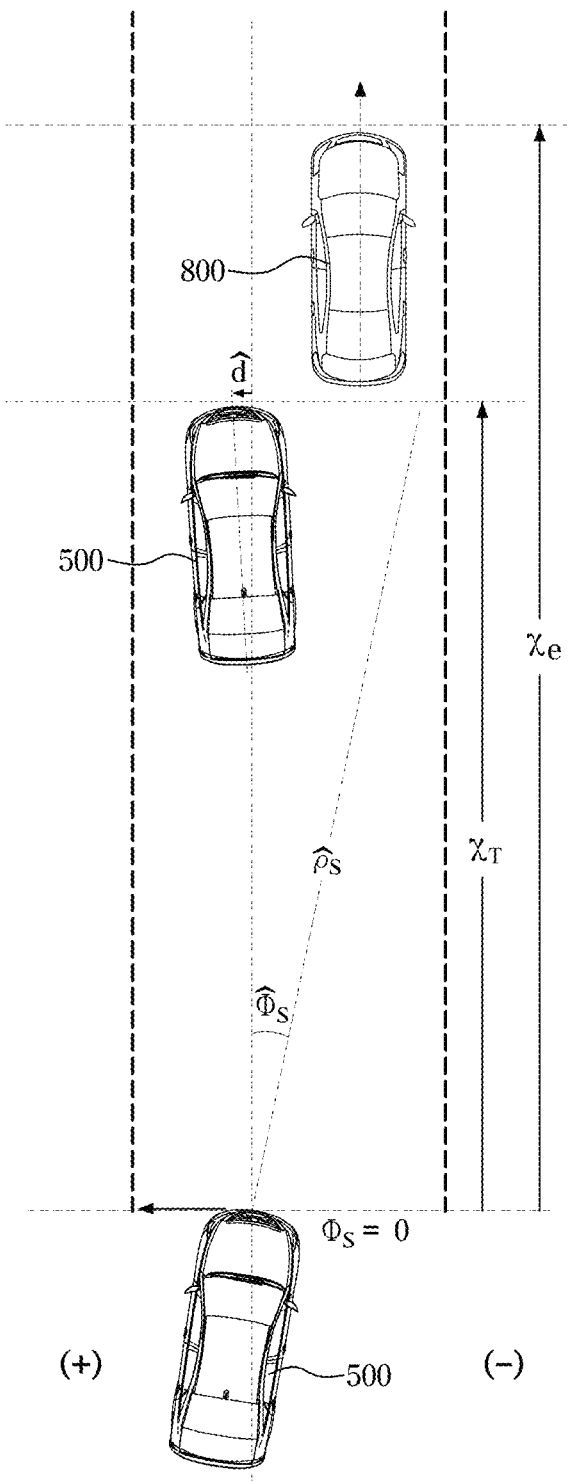
FIG. 9 is a view showing a case in which a situation of a curved road in FIG. 8 is replaced with a situation of a virtual straight road through coordinate system conversion.

The variables shown in FIG. 8 may be defined as follows.
ρ$_s$: Traveling curvature (=yaw rate/vehicle speed) of the host vehicle
x$_T$: Longitudinal distance between the host vehicle and a collision prediction point
Y$_{LtT}$: Distance from the left lane line to the target vehicle Ø$_s$: Relative heading angle with respect to the left lane line When the situation of the curved road in FIG. 8 is replaced with the virtual straight road through coordinate system conversion, the same result as in FIG. 9 can be obtained. FIG. 9 is a view showing a case in which the situation of the curved road in FIG. 8 is replaced with the situation of the virtual straight road through the coordinate system conversion. As shown in FIG. 9, the situation of the curved road in FIG. 8 has been replaced with the situation of the virtual straight road in FIG. 9 as it is.

$$\hat{y}(x) = y_0, \hat{\emptyset}(x) = 0, \hat{\rho}(x) = 0, \frac{d\hat{\rho}}{dx}(x) \qquad <\text{Equation 4}>$$

$$\hat{d} = y_0 + y_{LtT} + \frac{w_s + w_T}{2} \qquad <\text{Equation 5}>$$

$$\hat{\rho}_s = \rho_s - \rho_0 \qquad <\text{Equation 6}>$$

$$\hat{\emptyset}_s = -\emptyset_0 \qquad <\text{Equation 7}>$$

As expressed in Equations 4 to 7, it can be seen that a curvature function of the lane line and a heading function of the host vehicle 500 are removed through the coordinate system conversion. The variables in each of Equations 4 to 7 may be defined as follows.
ŷ(x): Lateral distance from a left side of the vehicle to the left lane line in the converted coordinate system
d̂: Target lateral distance in the converted coordinate system
ρ̂$_S$: Traveling curvature (yaw rate/vehicle speed) of the host vehicle in the converted coordinate system
Ø̂(x): Relative heading angle of the host vehicle with respect to the left lane line in the converted coordinate system
ρ̂(x): Curvature of the left lane line in the converted coordinate system $$\frac{d\hat{\rho}}{dx}(x):$$

(x) Curvature change rate of the left lane line in the converted coordinate system In the embodiment of the present disclosure, the situation of the curved road is replaced with the situation of the virtual straight road in order to reduce the amount of calculation for calculating the avoidance trajectory by removing the curvature function of the curved road and the heading function of the vehicle 500. By reducing the amount of calculation, it is possible to calculate the avoidance trajectory more simply and quickly.

Figure 10:
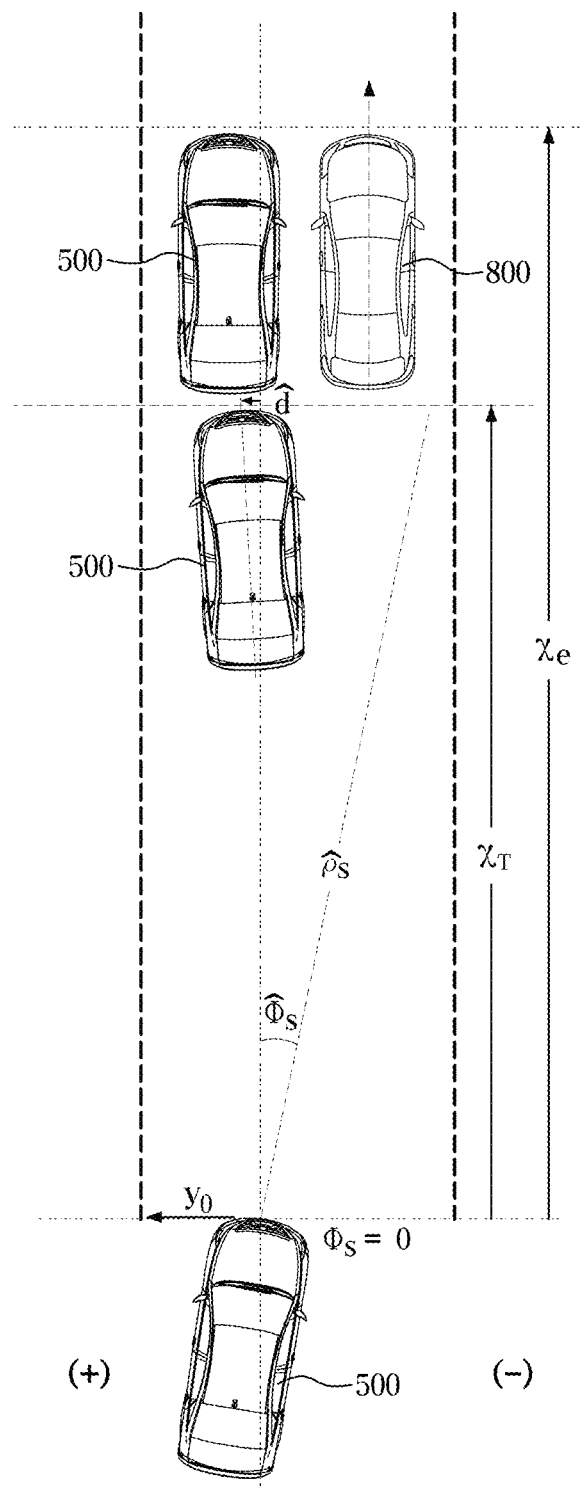
FIG. 10 is a view showing an avoidance trajectory calculated according to the embodiment of the present disclosure.

Returning back to FIG. 7, the avoidance trajectory for avoiding the collision on the virtual straight road replaced (generated) through the coordinate system conversion is calculated (714). FIG. 10 is a view showing the avoidance trajectory calculated according to the embodiment of the present disclosure. A desired lateral distance ŷ$_{des}$(x) of the avoidance trajectory, a desired lane line curvature ρ̂$_{des}$(x), and a desired heading angle Ø̂$_{des}$(x) of the host vehicle 500 may be expressed as follows. The desired lateral distance ŷ$_{des}$(x) is a lateral distance from the center of the host vehicle 500 on the avoidance trajectory to the left lane line. The desired lane curvature ρ̂$_{des}$(x) is a curvature of the lane line at the corresponding position on the avoidance trajectory.

The desired heading angle $\hat{\emptyset}_{des}(x)$ is a heading angle of the host vehicle 500 at the corresponding position on the avoidance trajectory. x denotes a distance from a present position of the host vehicle 500 to an arbitrary position in a longitudinal direction.

The desired avoidance trajectory is calculated using a trigonometric function in Equations 8 to 23 below because it is easy to calculate the avoidance trajectory when calculating a differential and/or an integral involved in calculating the avoidance trajectory and a maximum lateral acceleration of the host vehicle 500 required to avoid the collision may easily be calculated.

$$\hat{y}_{des}(x) = -A \cdot \left(\frac{x_e}{2\pi}\right)^2 \cdot \sin\left(x \cdot \frac{2\pi}{x_e}\right) - \qquad \text{<Equation 8>}$$

$$B \cdot \left(\frac{x_e}{2\pi}\right)^2 \cdot \cos\left(x \cdot \frac{2\pi}{x_e}\right) + \frac{C}{6}x^3 + \frac{D}{2}x^2 + Ex + F$$

$$\hat{y}_{des}(0) = 0 = -B \cdot \left(\frac{x_e}{2\pi}\right)^2 + F \qquad \text{<Equation 9>}$$

$$\hat{y}_{des}(x_T) = \hat{d} = -A \cdot \left(\frac{x_e}{2\pi}\right)^2 \cdot \sin\left(x_T \cdot \frac{2\pi}{x_e}\right) - \qquad \text{<Equation 10>}$$

$$B \cdot \left(\frac{x_e}{2\pi}\right)^2 \cdot \cos\left(x_T \cdot \frac{2\pi}{x_e}\right) + \frac{C}{6}x_T^3 + \frac{D}{2}x_T^2 + Ex_T + F$$

$$\hat{d} = -\left(E - \hat{\emptyset}_s\right) \cdot \frac{x_e}{2\pi} \cdot \sin\left(x_T \cdot \frac{2\pi}{x_e}\right) - \qquad \text{<Equation 11>}$$

$$B \cdot \left(\frac{x_e}{2\pi}\right)^2 \cdot \cos\left(x_T \cdot \frac{2\pi}{x_e}\right) + \frac{C}{6}x_T^3 + \frac{D}{2}x_T^2 + Ex_T + F$$

$$\hat{\rho}_{des}(x) = A \cdot \sin\left(x \cdot \frac{2\pi}{x_e}\right) + B \cdot \cos\left(x \cdot \frac{2\pi}{x_e}\right) + Cx + D, \qquad \text{<Equation 12>}$$

$$(x = [0, x_e])$$

$$\hat{\rho}_{des}(0) = \hat{\rho}_s = B+D \qquad \text{<Equation 13>}$$

$$\hat{\rho}_{des}(x_e) = 0 = B+Cx_e+D$$

$$\hat{\emptyset}_{des}(x) = \qquad \text{<Equation 15>}$$

$$-A \cdot \frac{x_e}{2\pi} \cdot \cos\left(x \cdot \frac{2\pi}{x_e}\right) + B \cdot \frac{x_e}{2\pi} \cdot \sin\left(x \cdot \frac{2\pi}{x_e}\right) + \frac{C}{2}x^2 + Dx + E$$

$$\hat{\emptyset}_{des}(0) = \hat{\emptyset}_s = -A \cdot \frac{x_e}{2\pi} + E \qquad \text{<Equation 16>}$$

$$\hat{\emptyset}_{des}(x_e) = \qquad \text{<Equation 17>}$$

$$0 = -A \cdot \frac{x_e}{2\pi} + \frac{C}{2}x_e^2 + Dx_e + E = \frac{x_e}{2\pi}\hat{\emptyset}_s + \frac{C}{2}x_e^2 + Dx_e$$

Here, A to F may each be expressed as follows.

$$A = \left(E - \hat{\emptyset}_s\right) \cdot \frac{2\pi}{x_e} \qquad \text{<Equation 18>}$$

$$B = \hat{\rho}_s - D \qquad \text{<Equation 19>}$$

$$C = -\hat{\rho}_s/x_e \qquad \text{<Equation 20>}$$

$$D = -\left(\hat{\emptyset}_s + \frac{C}{2}x_e^2\right)/x_e \qquad \text{<Equation 21>}$$

$$E = \qquad \text{<Equation 22>}$$

$$\left(\hat{\emptyset}_s \cdot \frac{x_e}{2\pi} \cdot \sin\left(x_T \cdot \frac{2\pi}{x_e}\right) - B \cdot \left(\frac{x_e}{2\pi}\right)^2 \cdot \cos\left(x_T \cdot \frac{2\pi}{x_e}\right) + \frac{C}{6}x_T^3 + \frac{D}{2}x_T^2 + F - \hat{d}\right) / \left(\frac{x_e}{2\pi} \cdot \sin\left(x_T \cdot \frac{2\pi}{x_e}\right) - x_T\right)$$

$$F = B \cdot \left(\frac{x_e}{2\pi}\right)^2 \qquad \text{<Equation 23>}$$

The controller 520 of the host vehicle 500 restores the virtual straight road to the original curved road through coordinate system restoration (716). That is, the controller 520 of the vehicle 500 restores the virtual straight road to the original curved road by applying the previously performed coordinate system conversion inversely.

When the restoration to the original curved road through the coordinate system restoration is completed, the controller 520 of the host vehicle 500 applies the avoidance trajectory calculated on the virtual straight road to the restored actual curved road (718).

Figure 11:
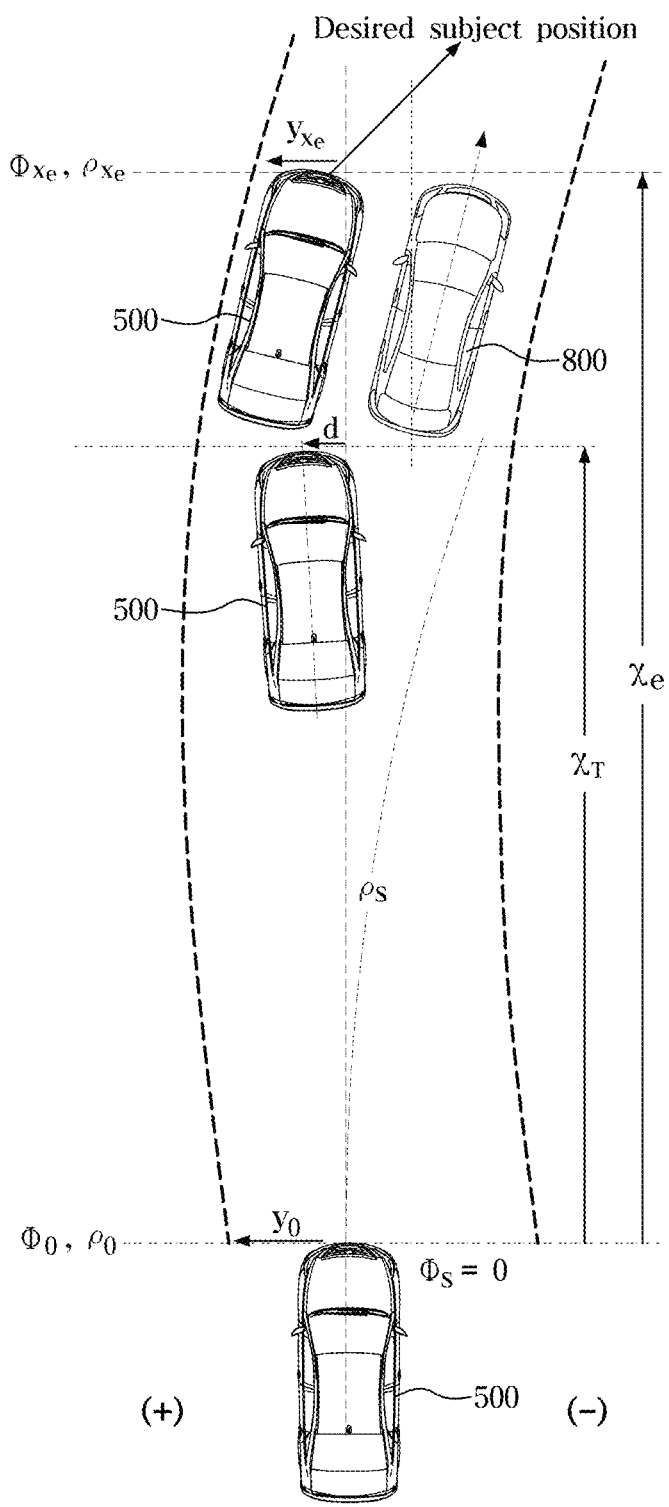
FIG. 11 is a view showing a result of restoring the virtual straight road to an original curved road.

FIG. 11 is a view showing a result of restoring the virtual straight road to the original curved road. As shown in FIG. 11, the information on the avoidance trajectory calculated previously has been applied to the result restored to the original curved road.

When a series of avoidance trajectory calculations as shown in FIGS. 7 to 11 are completed, as described above with reference to FIG. 6, the host vehicle 500 may travel along the calculated avoidance trajectory of the host vehicle 500 so that the host vehicle 500 may detour the target vehicle (another vehicle) 800 to avoid the collision.

As is apparent from the above description, according to one aspect of the present disclosure, it is possible to calculate an avoidance trajectory more simply and quickly in calculating the avoidance trajectory for avoiding a collision with nearby another vehicle.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A system for a vehicle comprising:
a detection device provided in a host vehicle to detect a position, a direction, and a speed of another vehicle around the host vehicle; and
a controller provided in the host vehicle and configured to:
predict a possibility of a collision between the host vehicle and the other vehicle based on the position, the direction, and the speed of the other vehicle detected by the detection device, and
calculate an avoidance trajectory for the host vehicle to avoid the collision with the other vehicle based on the possibility of the collision,
wherein the controller is configured to
predict the possibility of the collision based on a curvature function of a lane line that calculates a lane line curvature from an actual curved road, a heading function that calculates a heading angle of the host vehicle with respect to the lane line and a lateral distance function that calculates a lateral distance from a center of the host vehicle to the lane line,
replace the actual curved road with a virtual straight road using coordinate system conversion that removes the curvature function and the heading function based on the possibility of the collision,
calculate the avoidance trajectory on the virtual straight road based on a trigonometric function to calculate a maximum lateral acceleration of the host vehicle,
perform coordinate system restoration to apply the calculated avoidance trajectory to the actual curved road, and
control traveling of the host vehicle along the avoidance trajectory.

2. The system of claim 1, wherein the controller is configured to:
restore the virtual straight road to an original curved road through the coordinate system restoration.

3. The system of claim 1, wherein the detection device comprises a front camera provided to have a forward field of view of the vehicle.

4. The system of claim 1, wherein the detection device comprises a front radar provided to have a forward field of sensing of the vehicle and a plurality of corner radars installed at each corner of the vehicle.

5. The system of claim 4, further comprising:
a camera micro controller unit (MCU) provided to control the front camera; and
a radar MCU provided to control the front radar and the plurality of corner radars,
wherein the controller comprises an electrical control unit (ECU) provided to receive information on the position, the direction, and the speed of the other vehicle from the front camera, the front radar, and the plurality of corner radars by communicating with the camera MCU and the radar MCU.

6. A method for a vehicle, comprising:
detecting, by a detection device provided in the vehicle, a position, a direction, and a speed of another vehicle around a host vehicle;
predicting, by a controller provided in the vehicle, a possibility of a collision between the host vehicle and the other vehicle based on the position, the direction, and the speed of the other vehicle detected by the detection device; and
calculating, by the controller, an avoidance trajectory for the host vehicle to avoid the collision with the other vehicle based on the possibility of the collision,
wherein the predicting the possibility of the collision is based on a curvature function of a lane line that calculates a lane line curvature from an actual curved road, a heading function that calculates a heading angle of the host vehicle with respect to the lane line and a lateral distance function that calculates a lateral distance from a center of the host vehicle to the lane line,
wherein the calculating of the avoidance trajectory comprises:
replacing the actual curved road with a virtual straight road using coordinate system conversion that removes the curvature function and the heading function based on the possibility of the collision, and
calculating the avoidance trajectory on the virtual straight road based on a trigonometric function to calculate a maximum lateral acceleration of the host vehicle, and
further comprising:
performing coordinate system restoration to apply the calculated avoidance trajectory to the actual curved road,
wherein the method further comprises controlling traveling of the host vehicle along the avoidance trajectory.

7. The method of claim 6, wherein the performing of the coordinate system restoration includes
restoring the virtual straight road to an original curved road.

8. The method of claim 6, wherein the detection device comprises a front camera provided to have a forward field of view of the vehicle.

9. The method of claim 6, wherein the detection device comprises a front radar provided to have a forward field of sensing of the vehicle and a plurality of corner radars installed at each corner of the vehicle.

10. The method of claim 9, wherein the vehicle includes:
a camera micro controller unit (MCU) provided to control the front camera;
a radar MCU provided to control the front radar and the plurality of corner radars; and
an ECU provided to calculate the avoidance trajectory after receiving information on the position, the direction, and the speed of the other vehicle from the front camera, the front radar, and the plurality of corner radars by communicating with the camera MCU and the radar MCU.

\* \* \* \* \*